(12) United States Patent
Wei

(10) Patent No.: US 10,659,640 B2
(45) Date of Patent: May 19, 2020

(54) IMAGE FORMING APPARATUS WITH A DETECTOR THAT DETECTS A TYPE OF SHEET

(71) Applicant: Konica Minolta, Inc., Tokyo (JP)

(72) Inventor: Dong Wei, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/253,896

(22) Filed: Jan. 22, 2019

(65) Prior Publication Data

US 2019/0253575 A1 Aug. 15, 2019

(30) Foreign Application Priority Data

Feb. 14, 2018 (JP) .................. 2018-023856

(51) Int. Cl.
 *G03G 15/00* (2006.01)
 *H04N 1/00* (2006.01)
 *G03G 15/20* (2006.01)

(52) U.S. Cl.
 CPC ..... *H04N 1/00724* (2013.01); *G03G 15/2039* (2013.01); *G03G 15/607* (2013.01); *H04N 1/00037* (2013.01); *G03G 2215/00751* (2013.01)

(58) Field of Classification Search
 CPC ............. G03G 15/2039; G03G 15/607; G03G 15/6591; G03G 15/6508; G03G 15/5029; G03G 2215/616; G03G 2215/734; G03G 2215/738; G03G 2215/751; G03G 2215/447; G03G 2215/523

USPC ....... 399/16, 23, 38, 45, 124, 381, 384, 389, 399/391, 396
See application file for complete search history.

(56) References Cited

U.S. PATENT DOCUMENTS

| | | | |
|---|---|---|---|
| 6,718,145 B2 * | 4/2004 | Ohta .................. | G03G 15/5029 399/16 |
| 7,899,347 B2 * | 3/2011 | Matsumoto ........ | G03G 15/5029 399/45 |
| 9,575,450 B2 * | 2/2017 | Mamura ............ | G03G 15/5029 |

FOREIGN PATENT DOCUMENTS

JP 2015-014695 A 1/2015

* cited by examiner

*Primary Examiner* — Hoan H Tran
(74) *Attorney, Agent, or Firm* — Lucas & Mercanti, LLP

(57) ABSTRACT

Provided is an image forming apparatus capable of detecting a type of a sheet accommodated in a sheet feeding tray in advance. The image forming apparatus includes a conveyor, an image former, a fixer, a detector, and a processor. The conveyor conveys the sheet accommodated in the sheet feeding tray along a conveying path. The image former forms an image on the sheet. The fixer fixes the image onto the sheet. The detector is arranged on the conveying path and detects the type of the sheet. The processor executes a sheet type detection mode which is a mode for causing the detector to detect the type of the sheet conveyed by the conveyor before executing an image forming mode which is a mode for causing the image former to form the image and causing the fixer to fix the image.

19 Claims, 5 Drawing Sheets

IMAGE FORMING APPARATUS WITH A DETECTOR THAT DETECTS A TYPE OF SHEET

CROSS-REFERENCE TO RELATED APPLICATION

The entire disclosure of Japanese Patent Application No. 2018-023856, filed on Feb. 14, 2018, is incorporated herein by reference in its entirety.

BACKGROUND

1. Technological Field

The present invention relates to an image forming apparatus.

2. Description of the Related Art

A image forming apparatus including a sensor that automatically detects a type of a sheet used for printing is known. Such an image forming apparatus can set an appropriate printing condition on the basis of the type of the sheet detected by the sensor and execute printing.

In this regard, for example, an image forming apparatus that performs a sheet type determination operation through a sensor during a printing preparation operation, and changes printing conditions such as an image forming velocity and a fixing temperature on the basis of the determined sheet type is known. See Japanese Patent Publication No. 2015-14695.

SUMMARY

However, in the image forming apparatus described above, the sheet type determination operation is performed during the printing preparation operation started when a printing start command is received. Therefore, the image forming apparatus has a problem in that the sheet type determination operation is unable to be started, for example, unless a print job is input. Further, if a user is unable to check a type of a sheet in advance, in a case where a plurality of types of sheets is switched and used during printing, the type of the sheet has to be presented to and checked by the user each time the sheet is switched, and thus there is a problem in that productivity of the image forming apparatus is decreased.

Further, in the image forming apparatus described above, the printing conditions in the printing preparation operation are set on the basis of the sheet type which is predicted to be most likely set in a sheet feeding tray. Then, in a case where the predicted sheet type is different from the sheet type determined by the sheet type determination operation, switching, of the printing conditions is performed. For this reason, the image forming, apparatus is unable to resume image forming until the switching of the printing conditions which are once set is completed. Therefore, there is a problem in that a standby time of the image forming apparatus is increased.

The present invention has been made in light of the foregoing, and an object of the present invention is to provide an image forming apparatus capable of detecting a type of a sheet accommodated in a sheet feeding tray in advance.

To achieve at least one of the abovementioned objects, according to an aspect of the present invention, an image forming apparatus reflecting, one aspect of the present invention, comprises: a conveyor that conveys a sheet accommodated in a sheet feeding tray along a conveying path; an image former that forms an image on the sheet conveyed by the conveyor; a fixer that fixes the image formed by the image former onto the sheet; a detector that is arranged on the conveying path and detects a type of the sheet, and a hardware processor that executes a sheet type detection mode which is a mode for causing the detector to detect the type of the sheet conveyed by the conveyor before executing an image forming mode which is a mode for causing the image former to form the image and causing the fixer to fix the image.

The objects, features, and characteristics of the present invention other than those set forth above will become apparent from the description given hereinbelow with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
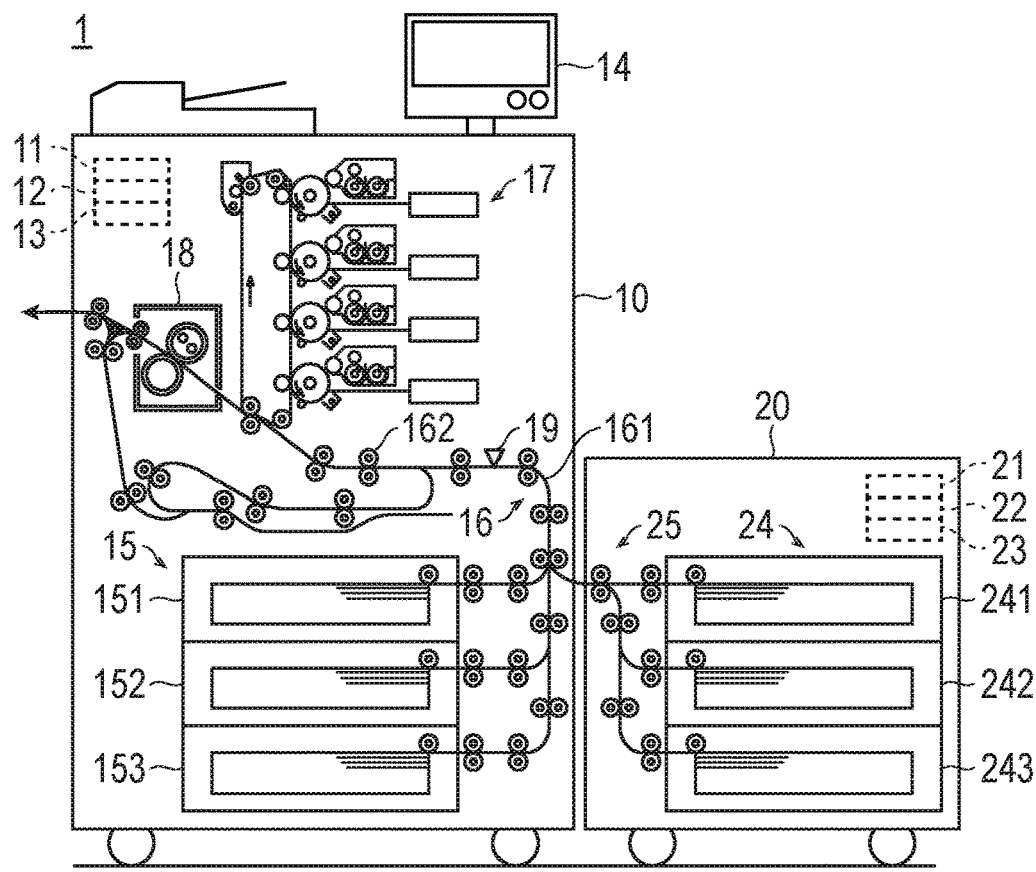
FIG. 1 is a diagram illustrating a schematic configuration of an image forming system according to an embodiment of the present invention.

Hereinafter, one or more embodiments of the present invention will be described with reference to the drawings. However, the scope of the invention is not limited to the disclosed embodiments.

In the description of the drawings, the same elements are denoted by the same reference numerals, and redundant description is omitted. In addition, in some cases, dimensional ratios in the drawings are exaggerated and different from actual ratios for convenience of the description.

FIG. 1 is a diagram illustrating a schematic configuration of an image forming system according to an embodiment of the present invention.

An image forming system 1 includes an image forming apparatus 10 and a sheet feeding apparatus 20 as illustrated in FIG. 1. The sheet feeding apparatus 20 is connected to the image forming apparatus 10 on an upstream side of sheet conveyance.

The image forming apparatus 10 includes a processor 11, a memory 12, a communicator 13, an operation panel 14, a sheet feeder 15, a conveyor 16, an image former 17, a fixer 18, and a detector 19. The respective components are connected to one another via a bus for exchanging signals.

The processor 11 includes a CPU (Central Processing Unit) and executes control of each of the above-described components and various kinds of arithmetic processing in accordance with programs.

The memory 12 includes a ROM (Read Only Memory) that stores various kinds of program and various types of data in advance, a RAM (Random Access Memory) that temporarily stores a program and data as a work area, a hard disk that stores various kinds of program and various types of data, or the like.

The communicator 13 includes an interface for communicating with other apparatuses. For example, the communicator 13 performs transmission and reception of various types of data, various kinds of signals, or the like with the sheet feeding apparatus 20. Further, the communicator 13 performs transmission and reception of various types of data or the like with the user's PC (Personal Computer), a mobile terminal, or the like via a network such as a LAN (Local Area Network).

The operation panel 14 includes, for example, a touch panel, a numeric keypad, a start button, a stop button, and the like, and functions as a display that displays various types of information and functions as an operation receiver that receives various kinds of operations of the user. For example, the operation panel 14 may display an operation screen as a display and receives an operation of the user in the operation screen as the operation receiver. Further, the display and the operation, receiver may be separately configured.

The sheet feeder 15 includes sheet feeding trays 151 to 153 that accommodate sheets to be used for printing, and feeds sheets accommodated in each sheet feeding tray one by one. Here, the number of the sheet feeding trays included in the sheet feeder 15 is not limited to the example illustrated in FIG. 1.

The conveyor 16 includes a conveying path 161, a plurality of pairs of conveying rollers 162 and a driving motor (not illustrated) for driving the conveying rollers 162 and conveys a sheet fed by the sheet feeder 15 along the conveying path 161.

The image former 17 forms an image on a sheet conveyed by the conveyor 16 using a well-known imaging process such as electrophotography.

The fixer 18 includes a heating roller heated by a heater and a pressing roller, heats and pressurizes a sheet on which an image is formed by the image former 17, and fix the image onto the sheet. Power supply to the heater is controlled so that a fixing temperature of the fixer 18 measured by a temperature sensor becomes a predetermined control temperature.

The detector 19 includes a sensor that is arranged on the conveying path 161 and detects a type of a sheet conveyed into a detection range of the detector 19. For example, one detector 19 may be arranged on the conveying path 161 on the downstream side of the sheet conveyance further than a merge point of the sheet fed from the sheet feeding trays 151 to 153 and the sheet fed from the sheet feeding apparatus 20. Alternatively, one detector 19 may be arranged for each sheet feeding tray, in the vicinity of each sheet feeding tray. Further, a type of a sheet detected by the detector 19 includes a sheet type, a sheet thickness, a basis weight, smoothness, and the like. A detailed configuration of the detector 19 will be described later.

Subsequently, the sheet feeding apparatus 20 includes a processor 21, a memory 22, a communicator 23, a sheet feeder 24, and a conveyor 25. The respective components are connected to one another via a bus for exchanging signals. Farther, since the processor 21, the memory 22, the communicator 23, and the conveyor 25 of the sheet feeding apparatus 20 have functions similar to those of the image forming apparatus 10, description thereof is omitted.

The sheet feeder 24 includes sheet feeding trays 241 to 243 that accommodate sheets to be used for printing and feeds sheets accommodated in each sheet feeding tray one by one. Here, the number of sheet feeding trays included in the sheet feeder 24 is not limited to the example illustrated in FIG. 1.

Further, the image forming system 1 may include can apparatus other than the image forming apparatus 10 and the sheet feeding apparatus 20. For example, the image forming system 1 may further include a post-processing apparatus on the downstream site of the image forming apparatus 10. Further, the sheet feeding apparatus 20 may not be installed outside the image forming apparatus 10.

Further, the image forming apparatus 10 and the sheet feeding apparatus 20 may include components other than the above-described components or may not include some of the above-described components. For example, the sheet feeding apparatus 20 may further include a detector. The detector of the sheet feeding apparatus 20 may detect a type of a sheet accommodated in the sheet feeding tray 241 to 243 instead of the detector 19 of the image forming apparatus 10.

Next, a detailed configuration of the detector 19 of the image forming apparatus 10 will be described.

Figure 2:
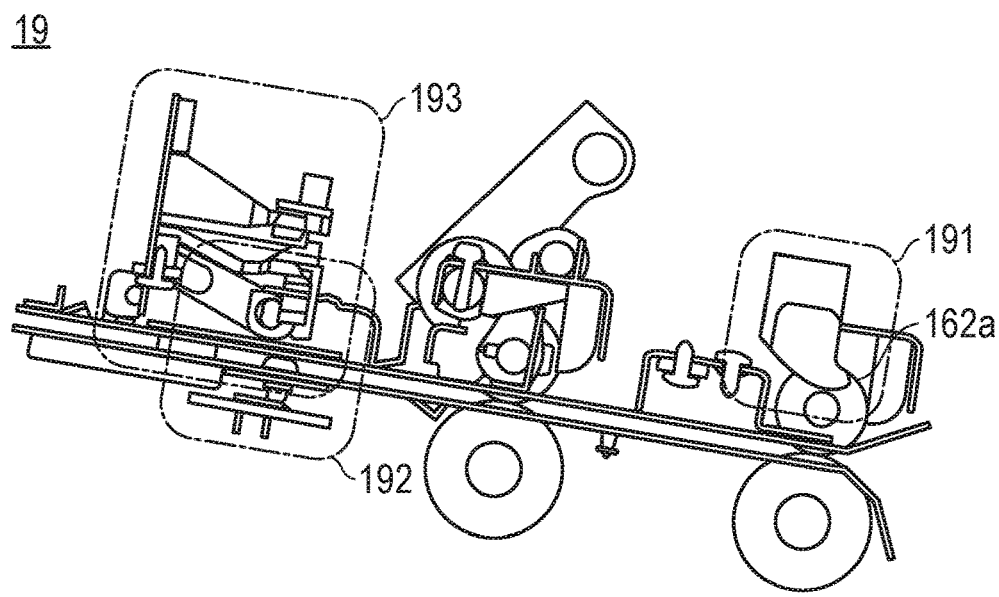
FIG. 2 is a diagram illustrating an example of a schematic configuration of a detector of an image forming apparatus.

FIG. 2 is a diagram illustrating an example of a schematic configuration of the detector of the image forming apparatus.

As illustrated in FIG. 2, the detector 19 includes a sheet thickness sensor 191, a basis weight sensor 192, and a smoothness sensor 193. These sensors are arranged on the conveying path 161.

The sheet thickness sensor 191 is a sensor that detects a thickness of a sheet (sheet thickness). As illustrated in FIG. 2, for example, the sheet thickness sensor 191 is attached to a conveying roller 162a included in the conveyor 16, and detects the sheet thickness on the basis of a displacement amount of the conveying roller 162a in a case where the sheet passes through it.

The basis weight sensor 192 is a sensor that detects a basis weight of a sheet. The basis weight sensor 192 includes, for example, a light emitter and a light receiver, and the light emitter and the light receiver are arranged respectively on both sides with respect to the sheet passing along the conveying path 161. Then, the basis weight sensor 192 detects the basis weight of the sheet on the basis of an amount of light which is emitted by the light emitter, transmitted through the sheet, and received by the light receiver. The light emitter may include, for example, an LED or the like.

The smoothness sensor 193 is a sensor that detects smoothness of a sheet. The smoothness sensor 193 includes, for example, a light emitter and a light receiver, and the light emitter and the light receiver are arranged on the same side with respect to the sheet passing along the conveying path 161. Further, the smoothness sensor 193 detects the smoothness of the sheet on the basis of the light which is emitted by the light emitter, reflected against the sheet, and received by the light receiver.

Further, the types of the sensors, the number of sensors, and the positions of the sensors included in the detector 19 are not limited to the example illustrated in FIG. 2. For example, the detector 19 may not include at least one of the sheet thickness sensor 191, the basis weight sensor 192, and the smoothness sensor 193. Further, the detector 19 may include another type of sensor that detects glossiness or the like. Furthermore, a method by which each sensor acquires sheet information is not limited to the above example.

In the image forming system 1 configured as described above, the image forming apparatus 10 executes an image forming mode and a sheet type detection mode, while switching between the two modes. The image forming mode is a mode for causing the image former 17 to form an image and causing the fixer 18 to fix the image. The sheet type detection mode is a mode for causing the detector 19 to detect a type of a sheet which is accommodated in at least one of the sheet feeding trays 151 to 153 and 241 to 243 and conveyed by the conveyor 16.

Further, the image forming apparatus 10 performs a preparation operation for causing the photoreceptor drum of the image former 17 to start rotating and causing, the fixer 18 to start warming up while the image forming mode is being executed. Further, in order to detect a type of an accommodated sheet in advance and smoothly set an appropriate printing condition when the sheet is used for printing, the image forming apparatus 10 executes the sheet type detection mode before executing the image forming mode.

Further, the image forming apparatus 10 may control the image former 17 such that an image is not formed on the sheet conveyed by the conveyor 16 while the sheet type detection mode is being executed. Further, the image forming apparatus 10 may control the fixer 18 such that the sheet conveyed by the conveyor 16 is neither heated nor pressurized while the sheet type detection mode is being executed. In other words, the image forming apparatus 10 may not supply power to the image former 17 and the fixer 18 while the sheet type detection mode is being executed.

First Embodiment

A procedure of a process of the image forming apparatus 10 according to the first embodiment of the present invention will be described below with reference to the appended drawings. The process of the image forming apparatus 10 performs control such that a type of a sheet accommodated in the sheet feeding tray is detected in advance.

Figure 3:
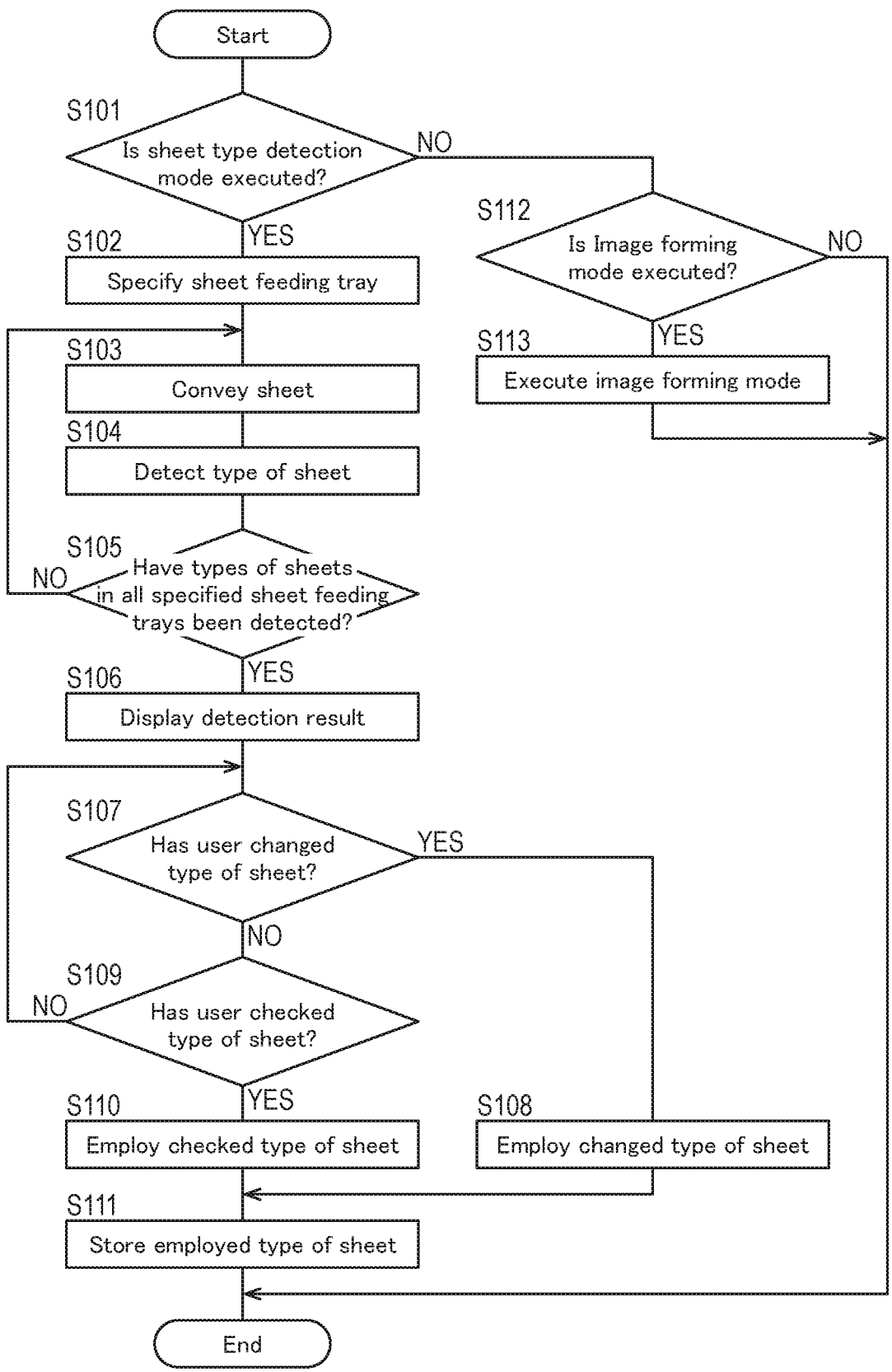
FIG. 3 is a flowchart illustrating a procedure of a process of an image forming apparatus according to a first embodiment.

FIG. 3 is a flowchart illustrating a procedure of the process of the image forming apparatus according to the first embodiment. An algorithm illustrated in the flowchart of FIG. 3 is stored as a program in the memory 12 of the image forming apparatus 10 and executed by the processor 11.

As illustrated in FIG. 3, the processor 11 first determines whether or not the sheet type detection mode is executed (step S101).

For example, in a case where at least one sheet feeding tray among the sheet feeding trays 151 to 153 is loaded in the image forming apparatus 10 (main body of the image forming apparatus 10), the processor 11 determines that the sheet type detection mode is executed. Alternatively, in a case where at least one sheet feeding tray among the sheet feeding trays 241 to 243 is loaded in the sheet feeding apparatus 20 (main body of the sheet feeding apparatus 20), and a notification indicating that the sheet feeding tray is loaded in the sheet feeding apparatus 20 is received from the processor 21, the processor 11 may determine that the sheet type detection mode is executed. In a case where the sheet feeding tray is loaded in the image forming apparatus 10 or the sheet feeding apparatus 20, there is a high possibility that sheets are newly set in the sheet feeding tray. Therefore, the image forming apparatus 10 determines that the sheet type detection mode is executed in order to check the type of the newly set sheet.

When it is determined that the sheet type detection mode is executed (step S101: YES), the processor 11 specifies a sheet feeding tray accommodating a sheet to be detected, that is, a sheet of which the type is to be detected (step S102).

For example, in step S101, in a case in which it is determined that the sheet feeding tray is loaded in the image forming apparatus 10 or the sheet feeding apparatus 20, and the sheet type detection mode is executed, the processor 11 specifies the loaded sheet feeding tray as the sheet feeding tray accommodating the sheet to be detected. Further, for example, in a case where a plurality of sheet feeding trays is loaded consecutively, the processor 11 may specify a plurality of the sheet feeding trays as the sheet feeding tray accommodating the sheet to be detected.

Further, the processor 11 may specify the sheet feeding tray other than the sheet feeding tray loaded in step S101 as the sheet feeding tray accommodating the sheet to be detected. For example, when the sheet feeding tray 151 is loaded in the image forming apparatus 10, in a case where a type of a sheet accommodated in the sheet feeding tray 152 has not been detected in the past, the processor 11 may specify both of the sheet feeding tray 151 and 152 as the sheet feeding buy accommodating the sheet to be detected.

Subsequently, the processor 11 causes the sheet feeder 15 to feed the sheet accommodated in the sheet feeding tray specified in step S102, and causes the conveyor 16 to convey the sheet (step S103). Then, the processor 11 causes the detector 19 to detect the type of the sheet being conveyed by the conveyor 16 (step S104). In other words, the processor 11 executes the sheet type detection mode by executing the process of steps S103 and S104 on the sheet accommodated in the sheet feeding tray specified in step S102. Further, the sheet of which the type is detected is continuously conveyed by the conveyor 16 and discharged outside the image forming apparatus 10.

The processor 11 may control each component of the image forming apparatus 10 so that each component performs an operation at a velocity corresponding to the sheet type detection mode in steps S103 and S104. For example, the processor 11 may cause the conveyor 16 to convey the sheet at a preset conveying velocity corresponding to the sheet type detection mode. Here, the "conveying velocity corresponding to the sheet type detection mode" may be a maximum value of the conveying velocity at which the detector 19 can detect a type of a sheet (that is, at which detection accuracy of the detector 19 can be secured). Further, the processor 11 may cause the conveyor 16 arranged within (inside) the detection range of the detector 19 (see FIG. 2) to convey the sheet at the conveying velocity corresponding to the sheet type detection mode and cause the conveyor 16 arranged outside the detection range of the detector 19 to convey the sheet at the maximum velocity.

Subsequently, the processor 11 determines whether or not the types of the sheets accommodated in all the sheet feeding trays specified in step S102 have been detected (step S105).

When it is determined that the types of the sheets accommodated in all the specified sheet feeding trays have not been detected (step S105: NO), the processor 11 returns to the process of step S103. Then, the processor 11 repeats the process of steps S103 to S105 until the process of steps S103 and S104 is executed on the sheets accommodated in all the sheet feeding trays specified in step S102.

When it is determined that the types of the sheets accommodated in all the specified sheet feeding trays have been detected (step S105: YES), the processor 11 proceeds to a process of step S106. Then, the processor 11 causes the operation panel 14 to display the type of the sheet detected by the detector 19 in step S104 associated with the sheet feeding tray accommodating the sheet, as a detection result (step S106). In other words, the processor 11 causes the operation panel 14 to display an operation screen (third operation screen) for causing the user to check the type of the sheet detected by the detector 19. Further, the processor 11 may cause the operation panel functioning as a display in a PC, a mobile terminal, or the like of the user to display the detection result via the communicator 13. Hereinafter, the operation panel 14 and the operation panel of the PC, the mobile terminal, or the like of the user are collectively referred to as an "operation panel 14 or the like."

Figure 4:
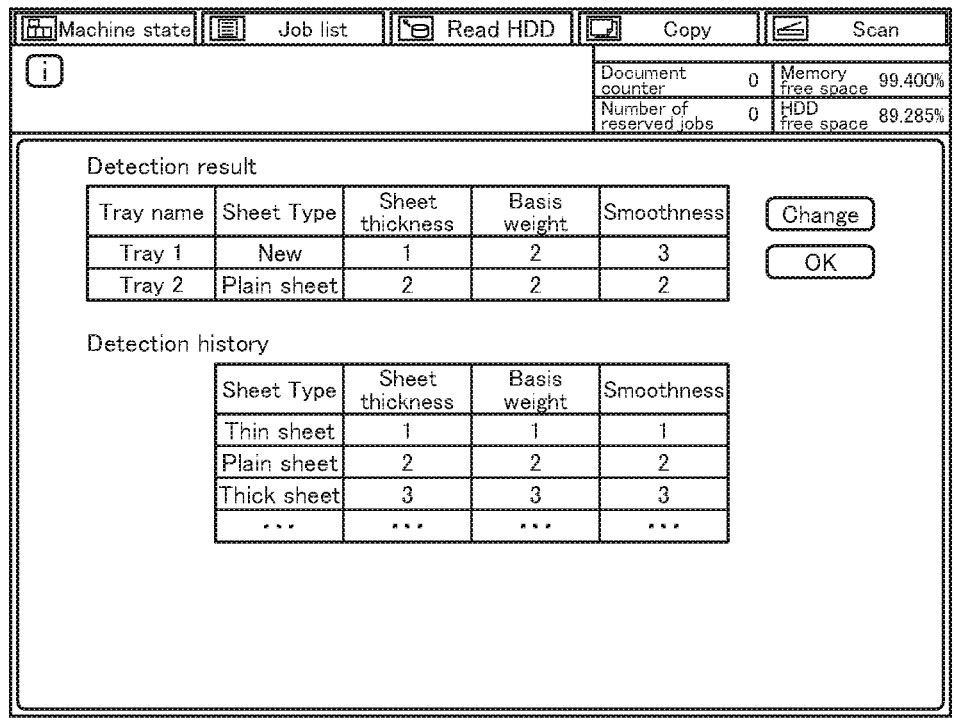
FIG. 4 is a diagram illustrating an example of an operation screen showing a detection result.

FIG. 4 is a diagram illustrating an example of an operation screen showing the detection result.

As illustrated in FIG. 4, the processor 11 causes the operation panel 14 or the like to display at least one of the types of the sheet detected by the detector 19 in step S104 (at least one of the sheet thickness, the basis weight, the smoothness, and the like) as the detection result. The detection result may be indicated by rank evaluation as illustrated in FIG. 4 instead of an actual detection value. For example, as the detection result of the sheet thickness, a rank 1 may be 52 to 59 $g/m^2$, a rank 2 may be 60 to 90 $g/m^2$, and a rank 3 may be 91 to 120 $g/m^2$.

Further, in a case where the type of the sheet which has never been detected in the past is detected, the processor 11 may cause the operation panel 14 or the like to display past detection histories in a list form. For example, in the example illustrated in FIG. 4, as the type of the sheet accommodated in a "tray 1" corresponding to the sheet feeding tray 151, the sheet thickness with the rank evaluation of 1, the basis weight with the rank evaluation of 2, and the smoothness with the rank evaluation of 3 have been detected. In a case where the type of the sheet including such a combination of the sheet thickness, the basis weight, and the smoothness has not been detected in the past, the processor 11 may cause the operation panel 14 or the like to display past detection histories in a list form as illustrated in FIG. 4. Further, the detection history may be displayed in association with the sheet feeding tray having accommodated the detected sheet.

Then, the processor 11 determines whether or not the user has changed the type of the sheet displayed on the operation panel 14 or the like in step S106 (step S107). For example, when an operation of the user for changing the type of the sheet is received via the operation panel 14 or the like, the processor 11 determines that the user has changed the type of the sheet.

For example, when an operation of the user for directly changing a numerical value indicating the rank evaluation of the type of the sheet and pressing a change button is received in the operation screen illustrated in FIG. 4, the processor 11 may determine that the user has changed the type of the sheet. Alternatively, when an operation of the user for selecting a correct type of a sheet from detection history list for types of sheets and pressing the change button is received, the processor 11 may determine that the user has changed the type of the sheet.

When it is determined that that the user has changed the type of the sheet (step S107: YES), the processor 11 employs the type of the sheet changed in step S107 as the type of the sheet associated with the sheet feeding tray (step S108).

When it is determined that the user has not changed the type of the sheet (step S107: NO), the processor 11 determines whether or not the user has checked the type of the sheet displayed on the operation panel 14 or the like in step S106 (step S109). In other words, the processor 11 determines whether or not the user has checked the type of the sheet once even in a case where the user has not changed the type of the sheet. For example, when an operation of the user for checking the type of the sheet is received via the operation panel 14 or the like, the processor 11 determines that the user has checked the type of the sheet. For example, when an operation of the user for pressing an OK buttons received in the operation screen as illustrated in FIG. 4, the processor 11 may determine that the user has checked the type of the sheet.

When it is determined that the user has not changed and checked the type of the sheet (step S109: NO), the processor 11 returns to the process of step S107. Then, the processor 11 repeats the process of steps S107 and S109 until the user changes or checks the type of the sheet.

When it is determined that the user has checked the type of the sheet (step S109: YES), the processor 11 employs the type of the sheet checked in step S109 as the type of the sheet associated with the sheet feeding tray (step S110).

Then, the processor 11 causes the memory 12 to store the type of the sheet employed in step S108 or S110 (step S111). Further, in a case where the processor 11 immediately executes the image forming mode after step S110, and the sheet of which the type is detected is used for printing, the processor 11 may immediately set the printing condition corresponding to the detected type of the sheet instead of causing, the memory 12 to store the type of the sheet. In other words, the processor 11 may control, for example, the rotating velocity of the photoreceptor drum of the image former 17, the fixing temperature of the fixer 18, or the like on the basis of the employed type of the sheet.

On the other hand, in step S101, when determined that the sheet type detection mode is not executed (step S101: NO), the processor 11 determines whether or not the image forming mode is executed (step S112).

When it is determined that the image forming mode is executed (step S112: YES), the processor 11 executes the image forming mode (step S113). In a case where the process of step S101 to S111 has been executed previously, and the sheet of which the type has been already detected is used for printing, the processor 11 may set the printing condition corresponding to the type of the sheet stored in the memory 12 in step S110 and then execute the image forming mode. In other words, the processor 11 may control, for example, the rotating velocity of the photoreceptor drum of the image former 17, the fixing temperature of the fixer 18, or the like as the printing condition, on the basis of the type of the sheet stored in the memory 12, and then execute the image forming mode.

When it is determined that the image forming mode is not executed (step S112: NO), the processor 11 ends the process.

As described above, the image forming apparatus 10 executes the sheet type detection mode before executing the image forming mode. Accordingly, the image forming apparatus 10 can detect the type of the sheet accommodated in the sheet feeding tray in advance in order to set the printing condition in accordance with the detected type of the sheet. Therefore, the image forming apparatus 10 can start the detection of the type of the sheet without being input a print job and reduce the standby time of the image forming apparatus 10 caused by the switching of the printing condition as well. In particular, since the image forming apparatus 10 can detect a type of a sheet to be used in advance, it is possible to omit time and effort for presenting the type of the sheet to be used to the user and causing the user to check it each time the sheet is switched and prevent a decrease in the productivity of the image forming apparatus 10.

Further, the image forming apparatus 10 does not form an image on the conveyed sheet while the sheet type detection mode is being executed. Accordingly, the image forming apparatus 10 can reduce the power consumption of the image forming apparatus 10 without supplying power to the image former 17 while the sheet type detection mode is being executed. Additionally, the user can cause the image forming apparatus 10 to reuse the sheet by resetting the sheet of which the type has been detected and which has been discharged outside the image forming apparatus 10, in the sheet feeding tray.

Further, in a case where the sheet feeding tray is loaded in the image forming apparatus 10 or the sheet feeding apparatus 20, the image forming apparatus 10 detects the type of the sheet accommodated in the loaded sheet feeding tray. Accordingly, the image forming apparatus 10 can automatically start the detection of the type of the sheet which is newly set in the sheet feeding tray without increasing the time and effort of the user.

Further, while the sheet type detection mode is being executed, the image forming apparatus 10 causes the conveyor 16 arranged within the detection range of the detector 19 to convey the sheet at the conveying velocity corresponding to the sheet type detection mode. Accordingly, the image forming apparatus 10 can improve the detection accuracy of the detector 19.

Further, the image forming apparatus 10 displays the detected type of the sheet. Accordingly, the image forming apparatus 10 can cause the user to check the detected type of the sheet.

Further, the image forming apparatus 10 employs the type of the sheet checked or changed by the user after the detected type of the sheet is displayed. Accordingly, the image forming apparatus 10 can cause the user to adjust even in a case where the type of the sheet detected by the detector 19 is incorrect.

Further, the image forming apparatus 10 controls the fixing temperature of the fixer 18 on the basis of the type of the sheet. Accordingly, the image forming apparatus 10 can set an appropriate fixing temperature from the beginning of printing and reduce the standby time caused by switching of the fixing temperature.

Although the example of the process of the image forming apparatus 10 has been described above, the present embodiment is not limited thereto. Various modifications, improvements, and the like to be described below can be made.

In step S101, the image forming apparatus 10 has been described as determining that the sheet type detection mode is executed, for example, in a case where the sheet feeding tray is loaded in the image forming apparatus 10 or the sheet feeding apparatus 20. However, the present embodiment is not limited thereto.

For example, in a case where there is a sheet feeding tray accommodating a sheet of which a type has not been detected, and the image forming mode is not being executed, in step S101, the image forming apparatus 10 may determine that the sheet type detection mode is executed. Further, "a case where the image formation mode is not being executed" indicates, for example, a case where the image forming apparatus 10 is in a standby state.

Then, in step S102, the image forming apparatus 10 may specify the above-described sheet feeding tray. Thereafter, the image forming apparatus 10 may cause the detector 19 to detect the type of the sheet of which the type has not been detected and which is accommodated in the sheet feeding tray in the sheet type detection mode executed in steps S103 and S104. Accordingly, the image forming apparatus 10 can execute the sheet type detection mode at an appropriate timing in cases other than a case where the sheet feeding tray is loaded in the image forming apparatus 10 or the sheet feeding apparatus 20. Therefore, for example, even in a case where the sheet feeding tray is loaded in a state in which the image forming apparatus 10 is powered off, and the sheet type detection mode is unable to be executed immediately after loaded, the image forming apparatus 10 can execute the sheet type detection mode after it is powered on.

Further, for example, the image forming apparatus 10 may display an operator screen for causing user to select the sheet type detection mode before step S101.

Figure 5:
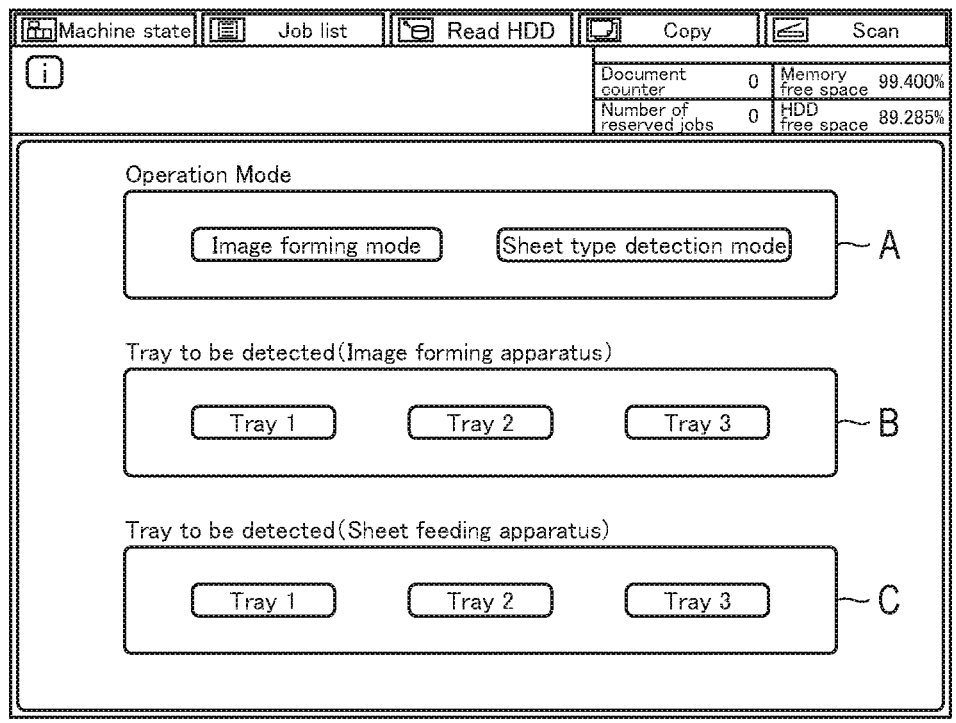
FIG. 5 is a diagram illustrating an example of an operation screen for receiving users selection.

FIG. 5 is a diagram illustrating an example of an operation screen for receiving the user's selection.

As illustrated in A of FIG. 5, the image forming apparatus 10 may cause the operation panel 14 or the like to display an operation screen (first operation screen) for causing the user to select the "image forming mode" or the "sheet type detection mode" as the operation mode of the image forming apparatus 10. Then, in a case where the sheet type detection mode is selected in the operation screen (that is, in a case where an operation of the user for selecting the sheet type detection mode is received), in step S101, the image forming apparatus 10 may determine that the sheet type detection mode is executed. Accordingly, the image forming apparatus 10 can execute the sheet type detection mode in accordance with a request from the user.

Further, in a case where the operation screen for causing the user to select the sheet type detection mode is displayed, the image forming apparatus 10 may further display an operation screen (second operation screen) for causing the user to select the sheet feeding tray accommodating the sheet to be detected as illustrated in B and C of FIG. 5. Then, in a case where the sheet feeding tray is selected in the operation screen, in step S102, the image forming apparatus 10 may specify the selected sheet feeding tray. Thereafter, in steps S103 and S104, the image forming apparatus 10 may cause the detector 19 to detect the type of the sheet accommodated in the specified sheet feeding tray. Accordingly, the image forming apparatus 10 can detect the type of the sheet accommodated in the sheet feeding tray which is intentionally selected by the user.

Further, the image forming apparatus 10 may cause the user to select a plurality of sheet feeding trays in the operation screen for causing the user to select the sheet feeding tray as illustrated in B and C in FIG. 5. Further, in a case where a plurality of sheet feeding trays is selected in the operation screen, in step S102, the image forming apparatus 10 may specify a plurality of the selected sheet feeding trays in the order in which the sheet feeding trays are selected. Thereafter, in steps S103 and S104, the image forming apparatus 10 may cause the detector 19 to detect the types of the sheets accommodated in a plurality of the specified sheet feeding trays in the order in which the sheet feeding trays are specified.

For example, in the operation screen as illustrated in B of FIG. 5, it is assumed that the user selects sheet feeding trays in the order of the "tray 1" corresponding to the sheet feeding tray 151 and the "tray 2" corresponding to the sheet feeding tray 152 in the image forming apparatus 10. In this case, the image forming apparatus 10 may detect the type of the sheet accommodated in the sheet feeding tray 151 and then detect the type of the sheet accommodated in the sheet feeding tray 152. Accordingly, the image forming apparatus 10 can preferentially detect the type of the sheet accommodated in the sheet feeding tray preferentially selected by the user.

Further, in a case where the print job has been received, and the sheet type detection mode is executed, in step S102, the image forming apparatus 10 may specify a plurality of the sheet feeding trays to be used in the order in which the sheet feeding trays are used in the print job. Then, in steps S103 and S104, the image forming apparatus 10 may cause the detector 19 to detect the types of the sheets accommodated in a plurality of the specified sheet feeding trays in the order in which the sheet feeding trays are specified.

For example, it is assumed that the image forming apparatus 10 receives print jobs in the order of a job 1 and a job 2 which are print jobs and the job 1 specifies the sheet feeding tray 151, and the job 2 specifies the sheet feeding tray 152. In a case where the sheet feeding trays 151 and 152 are loaded in the image forming apparatus 10 in this state, the image forming apparatus 10 may detect the type of the sheet accommodated in the sheet feeding tray 151 and then detect the type of the sheet accommodated in the sheet feeding tray 152. Alternatively, in a case where the sheet feeding tray 151 and the sheet feeding tray 152 are selected in the operation screen in the above state, the image forming apparatus 10 may detect the type of the sheet accommodated in the sheet feeding tray 151 and then detect the type of the sheet accommodated in the sheet feeding tray 152. Accordingly, the image forming apparatus 10 can preferentially detect the type of the sheet accommodated in the sheet feeding tray which is preferentially used in the print job.

Further, in a case where the print job has been received, and a plurality of sheet feeding trays is selected in the operation screen, the image forming apparatus 10 may give priority to either the order in which a plurality of the sheet feeding trays is used in the print job or the order in which a plurality of the sheet feeding trays is selected. In other words, the image forming apparatus 10 may detect the types of the sheets accommodated in a plurality of the sheet feeding trays in the order in which the sheet feeding trays are used in the print job or may detect the types of the sheets accommodated in a plurality of the sheet feeding trays in the order in which the sheet feeding trays are selected. Alternatively, the image forming apparatus 10 may necessarily give priority to the order in which a plurality of the sheet feeding trays is used in the print job in a case where the print job has been received and may consider the order in which a plurality of the sheet feeding trays is selected only in a case where the print job has not been received.

Further, the image forming apparatus 10 has been described as detecting the types of the sheets accommodated in all the sheet feeding trays specified in step S102, then displaying the detection result, and determining whether or not the user has changed or checked the types of the sheets. However, the present embodiment is not limited thereto. Each time the type of the sheet accommodated in one sheet feeding tray is detected, the image forming apparatus 10 may display the detection result and determine whether or not the user has changed or checked the type of the sheet.

Second Embodiment

A procedure of a process of an image forming apparatus 10 according to the second embodiment of the present invention will be described below with reference to the appended drawings, in the second embodiment, the image forming apparatus 10 is configured to be able to execute the sheet type detection mode while the print job is being executed.

In the second embodiment, the image forming apparatus 10 executes the sheet type detection mode, for example, in a case where the sheet feeding tray 152 is loaded in the image forming apparatus 10 while the print job is being executed using the sheet accommodated in the sheet feeding tray 151. Alternatively, the image forming apparatus 10 may execute the sheet type detection mode in a case where an operation of the user for selecting the sheet type detection mode is received in the operation screen as illustrated in A of FIG. 5 while the print job is being executed. In other words, in a case where the user desires to check the type of the sheet accommodated in the sheet feeding tray to be used in a later print job, the user can cause the image forming apparatus 10 to execute the sheet type detection mode even while the print job is being executed.

Figure 6A:
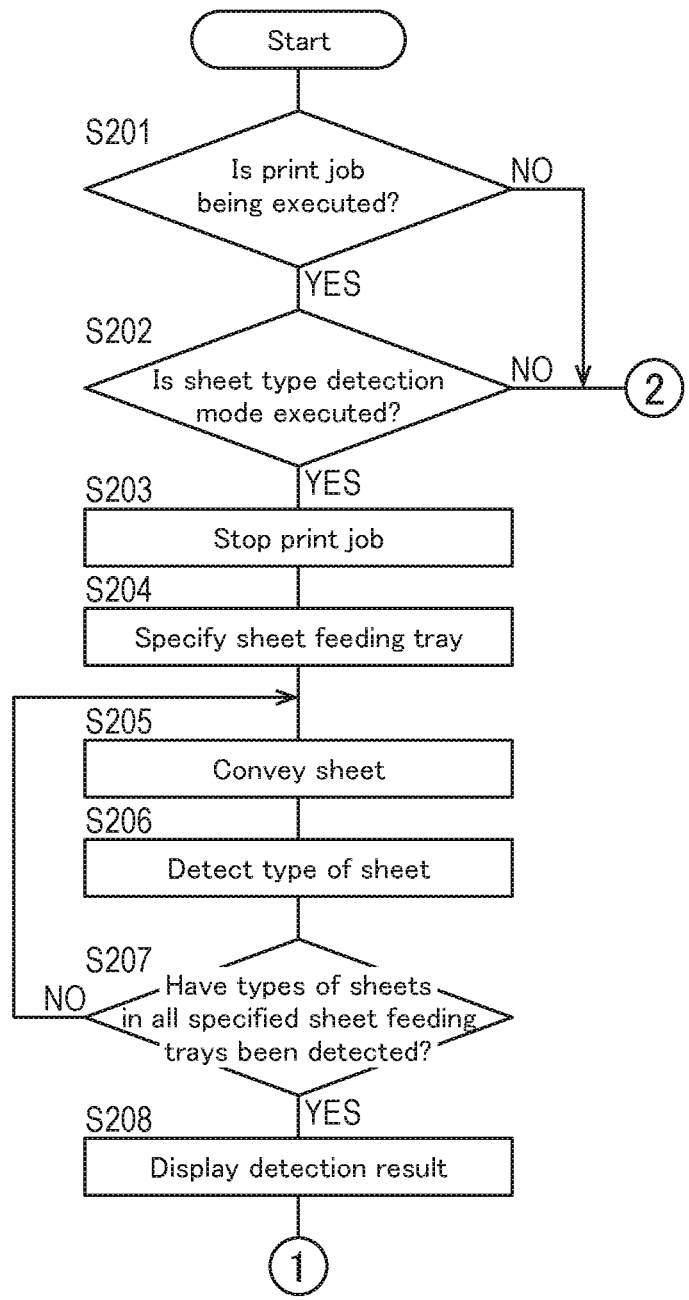
FIG. 6A is a flowchart illustrating a procedure of a process of an image forming apparatus according to a second embodiment.
Figure 6B:
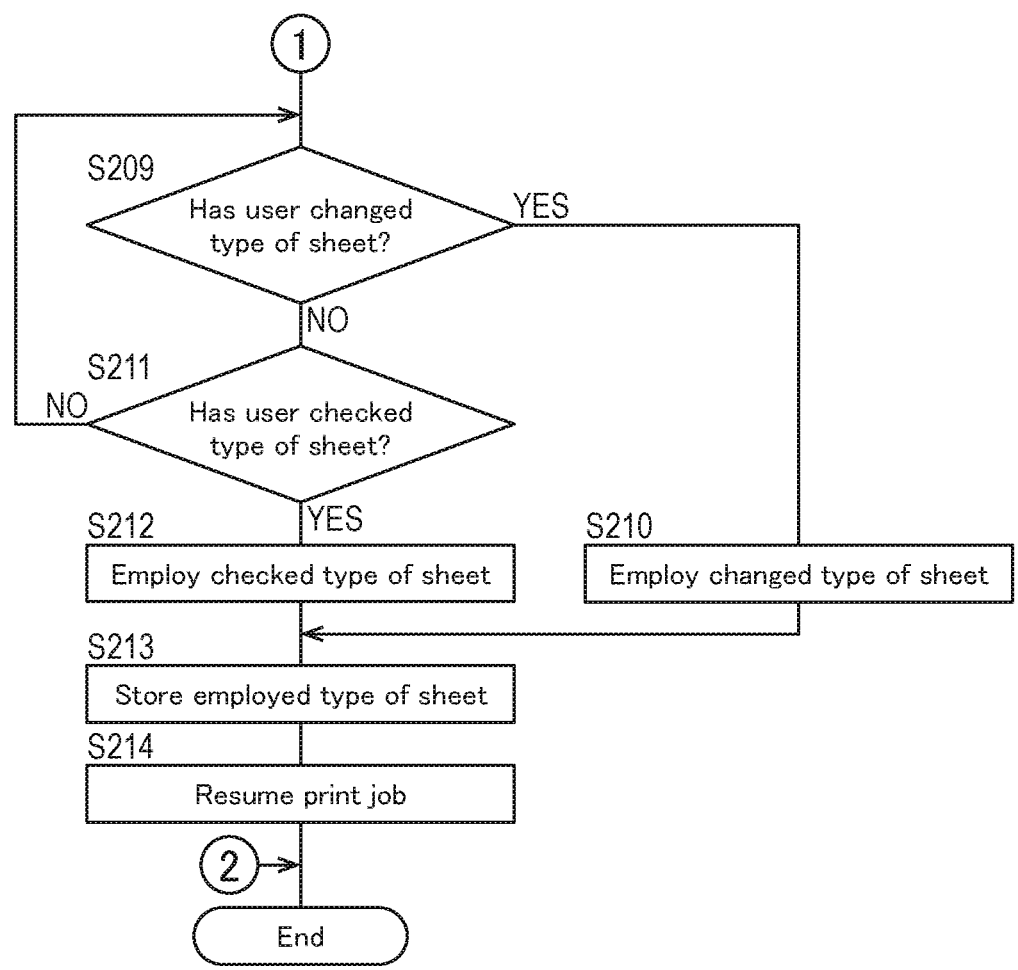
FIG. 6B is a flowchart illustrating a procedure of a process of the image forming apparatus according to the second embodiment.

FIGS. 6A and 6B are flowcharts illustrating a procedure of a process of the image forming apparatus according to the second embodiment. The process of steps S204 to S213 illustrated in FIG. 6A and FIG. 6B is similar to the process of steps S102 to S111 illustrated in FIG. 3, and thus description thereof is omitted.

As illustrated in FIGS. 6A and 6B, the processor 11 first determines whether or not the print job is being executed (step S201).

When it is determined that the print job is being executed (step S201: YES), the processor 11 determines whether or not the sheet type detection mode is executed (step S202). The processor 11 may determine that the sheet type detection mode is executed, for example, in a case where an unused sheet feeding tray is loaded in the image forming apparatus 10 or the sheet feeding apparatus 20 while the print job is being executed.

When it is determined that the sheet type detection mode is executed (step S202: YES), the processor 11 stops execution of the print job (step S203). Then, the processor 11 proceeds to a process of step S204. Subsequently, the processor 11 executes a process of steps S204 to S213, and then resumes the execution of the print job stopped in step S203 (step S214). Thereafter, the processor 11 ends the process. Further, even in a case where the execution of the print job is stopped in step S203, the processor 11 may cause the fixer 18 to hold the fixing temperature before stopping the execution of the print job.

When it is determined that the print job is not being executed (step S201: NO) or when it is determined that the sheet type detection mode is not executed (step S202: NO), the processor 11 ends the process.

As described above, in a case where it is determined that the sheet type detection mode is executed while the print job is being executed, the image forming apparatus 10 according to the second embodiment stops the execution of the print job and executes the sheet type detection mode. Accordingly, the image forming apparatus 10 can execute the sheet type detection mode if necessary even while the print job is being executed and detect the type of the sheet accommodated in the sheet feeding tray to be used in, for example, a later print job in advance. Further, since the image forming apparatus 10 can detect the type of the sheet to be used in a later print job in advance, it is possible to omit time and effort for presenting the type of the sheet to be used to the user and causing the user to check it each time the sheet is switched and prevent a decrease in the productivity of the image forming apparatus 10.

Further, in a case where the execution of the print job is stopped, and the sheet type detection mode is executed, the image forming apparatus 10 causes the fixer 18 to hold the fixing temperature before stopping the execution of the print job. Accordingly, the image forming apparatus 10 can reduce the warm-up time of the fixer 18 when the stopped execution of print job is resumed.

Further, the processes of the first and second embodiments may be combined. In other words, the image forming apparatus 10 may execute the sheet type detection mode before executing the image forming mode and may also be able to execute the sheet type detection mode while the print job is being executed.

In the above embodiments, the image forming apparatus 10 has been described as one apparatus. However, the above embodiments are not limited thereto. For example, for the image forming apparatus 10, an information processing apparatus that executes various kinds of determination processes and an apparatus that executes an image forming process may be separately configured. In this case, the information processing apparatus and the apparatus that executes the image forming process are connected via a bus.

Further, the process in the image forming apparatus 10 according to the above embodiment may include a step other than steps of the flowchart described above or May not include some of the steps. Further, the order of steps is not limited to that of the above embodiments. Further, each step may be combined with another step and executed as one step, may be included in another step, or may be divided into a plurality of steps.

Further, means and methods for performing various kinds of processes in the image forming apparatus 10 according to the above embodiments can be realized by any of a dedicated hardware circuit or a programmed computer. The program may be provided by a computer-readable recording medium such as a CD-ROM (Compact Disc Read Only Memory) or may be provided online via a network such as the Internet. In this case, the program recorded in the computer readable recording medium is usually transferred to and stored in a memory such as a hard disk. Further, the program may be provided as single application software or may be incorporated into software of the apparatus as a function of the image forming apparatus 10.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus, comprising:
a conveyor that conveys a sheet accommodated in a sheet feeding tray along a conveying path;
an image former that forms an image on the sheet conveyed by the conveyor;
a fixer that fixes the image formed by the image former onto the sheet;
a detector that is arranged on the conveying path and detects a type of the sheet, and
a hardware processor that executes an image forming mode and a sheet type detection mode, the image forming mode being a mode for causing the image former to form the image and causing the fixer to fix the image, the sheet type detection mode being different from the image forming mode and is a mode for causing the detector to detect the type of the sheet conveyed by the conveyor, wherein the hardware processor controls the image former so that an image is not formed on the sheet conveyed by the conveyor during execution of the sheet type detection mode.

2. The image forming apparatus according to claim 1, wherein, when the sheet feeding tray is loaded in a main body of the image forming apparatus, the hardware processor determines that the sheet type detection mode is executed, and causes the detector to detect the type of the sheet accommodated in the loaded sheet feeding tray.

3. The image forming apparatus according to claim 1, wherein, when the sheet feeding tray is loaded in a sheet feeding apparatus which is connected to the image forming apparatus and comprises the sheet feeding tray, the hardware processor determines that the sheet type detection mode is executed, and causes the detector to detect the type of the sheet accommodated in the loaded sheet feeding tray.

4. The image forming apparatus according to claim 1, wherein, when there is the sheet feeding tray accommodating the sheet of which the type has not been detected, and the image forming mode is not being executed, the hardware processor determines that the sheet type detection mode is executed, and causes the detector to detect the type of the sheet of which the type has not been detected.

5. The image forming apparatus according to claim 1, wherein, when the sheet type detection mode is selected in a first operation screen which is an operation screen for causing a user to select the sheet type detection mode, the hardware processor determines that the sheet type detection mode is executed.

6. The image forming apparatus according to claim 5, wherein, when the sheet feeding tray is further selected in a second operation screen which is an operation screen for causing the user to select the sheet feeding tray accommodating the sheet to be detected, the hardware processor causes the detector to detect the type of the sheet accommodated in the selected sheet feeding tray in the sheet type detection mode.

7. The image forming apparatus according to claim 6, wherein, when a plurality of sheet feeding trays is selected in the second operation screen, the hardware processor causes the detector to detect the types of the sheets accommodated in the plurality of the selected sheet feeding trays in an order in which the sheet feeding trays are selected in the sheet type detection mode.

8. The image forming apparatus according to claim 1, wherein, when a print job has been received, and the sheet type detection mode is executed, the hardware processor causes the detector to detect the types of the sheets accommodated in a plurality of sheet feeding trays to be used in an order in which the sheet feeding trays are used in the print job.

9. The image forming apparatus according to claim 1, wherein the hardware processor causes the conveyor arranged within a detection range of the detector to convey the sheet at a conveying velocity corresponding to the sheet type detection mode while the sheet type detection mode is being executed.

10. The image forming apparatus according to claim 1, wherein the hardware processor causes a display to display a third operation screen which is an operation screen for causing a user to check the type of the sheet detected by the detector.

11. The image forming apparatus according to claim 10, wherein, when the type of the sheet is changed in the third operation screen, the hardware processor employs the changed type of the sheet, and when the type of the sheet is checked in the third operation screen, the hardware processor employs the checked type of the sheet.

12. The image forming apparatus according to claim 1, wherein the hardware processor controls a fixing temperature of the fixer on the basis of the type of the sheet.

13. The image forming apparatus according to claim 1, wherein the hardware processor is capable of further executing the sheet type detection mode while a print job is being executed and, when it is determined that the sheet type detection mode is executed while the print job is being executed, the hardware processor stops execution of the print job, and executes the sheet type detection mode.

14. The image forming apparatus according to claim 13, wherein, when the execution of the print job is stopped, and the sheet type detection mode is executed, the hardware processor causes the fixer to hold a fixing temperature before the execution of the print job is stopped.

15. The image forming apparatus according to claim 1, wherein the detector includes sheet thickness sensor, a basis weight sensor, and a smoothness sensor.

16. The image forming apparatus according to claim 15, wherein the sheet thickness sensor includes a conveying roller and detects a sheet thickness based on a displacement of the conveying roller.

17. The image forming apparatus according to claim 15, wherein the basis weight sensor include a light emitter and a light receiver on opposing sides of the sheet on the conveyor path and a basis weight of the sheet based on an amount of light received by the light receiver.

18. The image forming apparatus according to claim 15, wherein the smoothness sensor includes a light emitter and a light receiver arranged on a same side of the sheet on the conveyor path and detects smoothness based on light received by the light receiver.

19. The image forming apparatus according to claim 1, wherein the hardware processor executes the sheet type detection mode separately from the image forming mode based on receiving a request which is different from a request for executing the image forming mode.

* * * * *